A. A. WARNER.
ELECTRICAL COOKING UTENSIL.
APPLICATION FILED OCT. 1, 1913.

1,179,986.

Patented Apr. 18, 1916.
2 SHEETS—SHEET 1.

WITNESSES:

INVENTOR.
Alonzo A. Warner:
BY

ATTORNEY.

A. A. WARNER.
ELECTRICAL COOKING UTENSIL.
APPLICATION FILED OCT. 1, 1913.
1,179,986.
Patented Apr. 18, 1916.
2 SHEETS—SHEET 2.
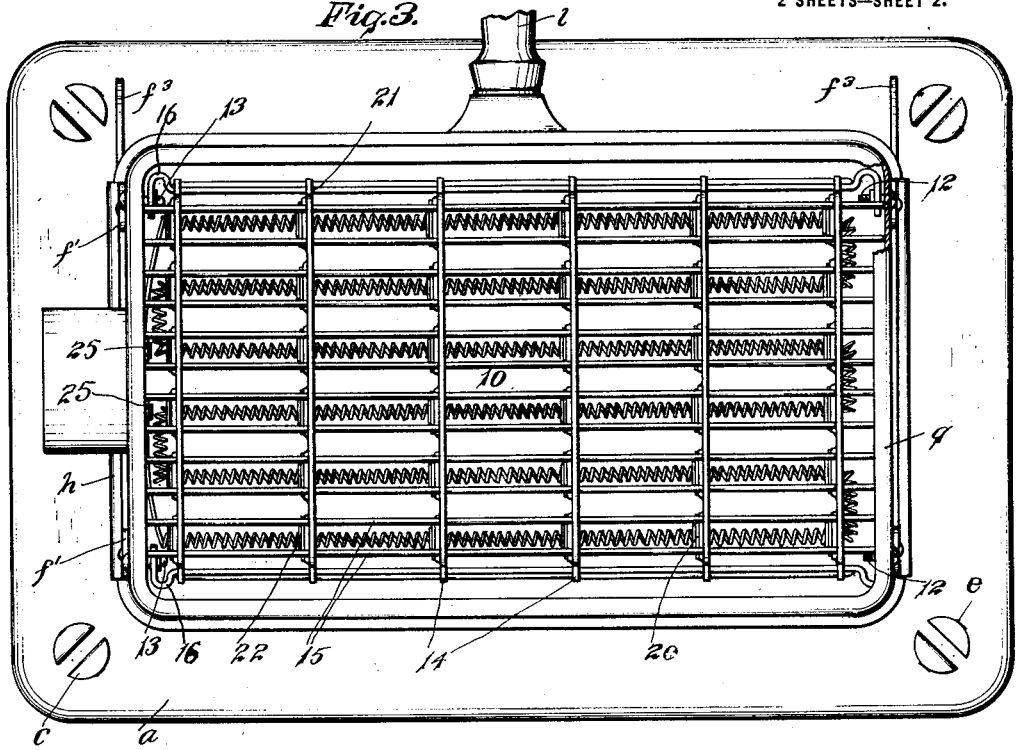
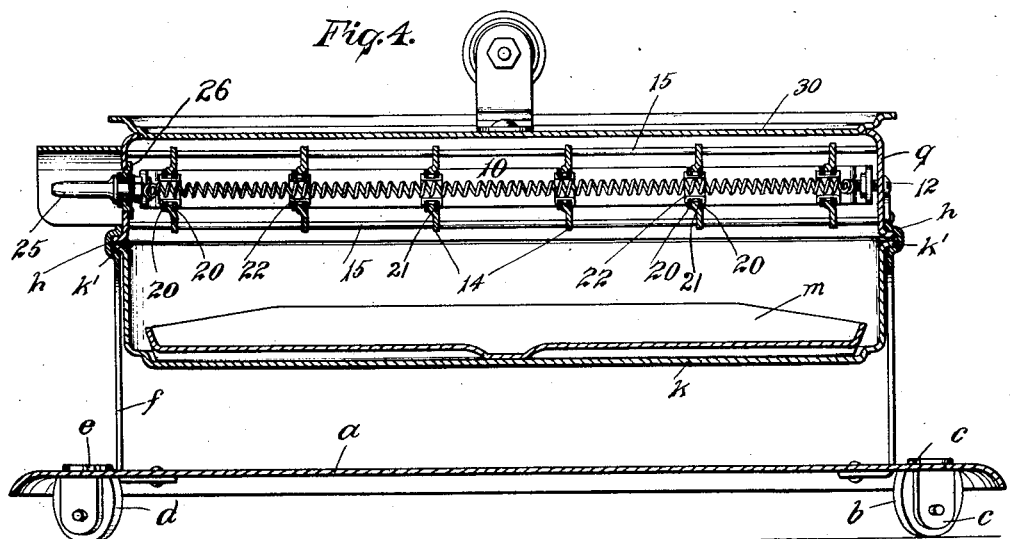
WITNESSES:
INVENTOR.
Alonzo A. Warner:
BY
N. E. Hart
ATTORNEY.

UNITED STATES PATENT OFFICE.

ALONZO A. WARNER, OF NEW BRITAIN, CONNECTICUT, ASSIGNOR TO LANDERS, FRARY & CLARK, OF NEW BRITAIN, CONNECTICUT, A CORPORATION OF CONNECTICUT.

ELECTRICAL COOKING UTENSIL.

1,179,986.      Specification of Letters Patent.      Patented Apr. 18, 1916.

Application filed October 1, 1913. Serial No. 792,768.

*To all whom it may concern:*

Be it known that I, ALONZO A. WARNER, a citizen of the United States, and a resident of New Britain, in the county of Hartford and State of Connecticut, have invented certain new and useful Improvements in Electrical Cooking Utensils, of which the following is a specification.

The device forming the subject matter of this invention is adapted for various uses, and in the trade is commonly called a grill.

It is the purpose of this invention to produce an article of the character described having features of novelty and advantage, especially in the construction of the holder, the mounting of the electrical heater and the arrangement of the food receptacles.

Features of invention relating to other parts of the structure are also present and will be particularly described and claimed.

Figure 1:
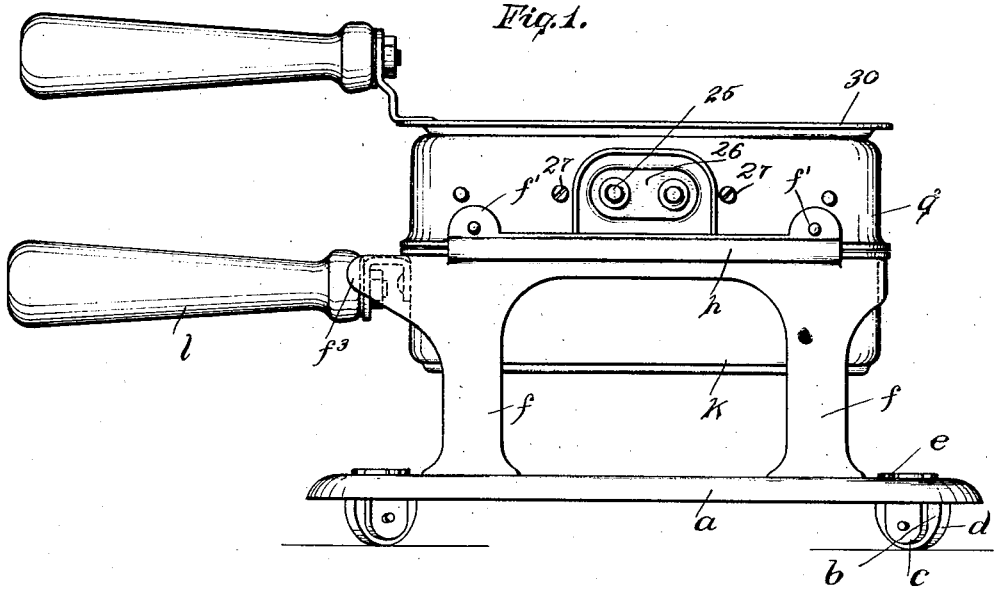
Figure 2:
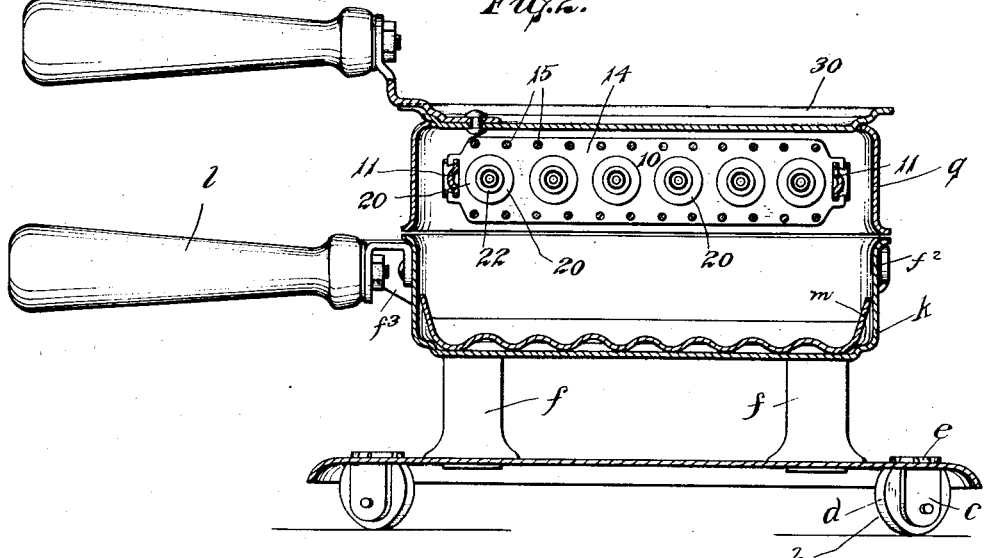

In the drawings, Figure 1 is an end view of a grill made in accordance with my invention. Fig. 2 is a transverse section of the same. Fig. 3 is a plan view. Fig. 4 is a sectional side view.

For convenience and economy in manufacture, the various parts of the device are formed of sheet metal.

$a$ denotes the base supported on insulated feet $b$ formed by projecting ears $c, c$, through slots in the base and securing between them disks $d$ of insulating material, which bear against the underside of the base, the upper ends of the ears $c, c$, above the base being turned over onto the base and having a tip $e$ passing therethrough and locking the parts into position.

$f, f$, are standards, the bottoms of which are shouldered to bear upon the base and have projections extending through slots in the base and bent over against the underside thereof, being secured in position by pins. Arranged between the standards is the body of the device $g$, secured to the standards $f'$ $f'$.

The standards are longitudinally channeled just under the body, as at $h, h$, to form ways upon which the food receptacle $k$ may slide, supported thereon by the flanges $k', k'$; stops $f^2, f^2$, at the back of the standards, formed by bending projecting ears around at right angles, properly position the receptacle $k$ under the body, the projecting lips $f^3, f^3$ at the front facilitating the entrance of the flanges $k', k'$ into the channels. This food receptacle is provided with a handle $l$ and has a tray $m$ fitted within it.

The heater, by which term I mean the complete structure and not merely the resistance element, is designated generally by 10, and comprises a frame composed of side members 11, 11, cross bars 14 supported at their ends on the side members 11, 11, and guard wires 15 threaded through holes in the upper and lower edges of these cross bars.

A convenient way of supporting the heater so that it may move relatively to the body under expansion is to secure the frame at one end to the body as by the screws 12, and slidingly support the opposite end on the pins 13, 13, the ends of the side body members being offset as at 16. In some cases sufficient play may be secured by securing both ends of the side members to the frame by screws and enlarging the offsets.

Each of the cross bars has a number of apertures through which the resistance element passes and in which it is supported, and these apertures are insulated in the manner now to be described in order to prevent short-circuiting of the resistance element.

At each aperture and on each side of the cross bars are washers 20 of mica or other insulating material, the holes in the washers being smaller than the apertures in the cross bars, and the washers are prevented from shifting by slightly recessing the cross bars as indicated at 21, in which depression one of the washers rests; the two washers are connected by an eyelet 22 to hold them in position. The resistance element which as shown is in the form of a continuous coil of wire, passes through and is supported by the eyelets, and by the mica washers is insulated from the cross bars. The ends of the coil are connected to plugs 25 or other suitable form of attachment, supported in a plate 26 secured to the body as by the screws 27, 27. A second receptacle 30 is fitted closely into the top of the body and serves both for the cooking of food and as a cover.

It will be noted that the heater is spaced from the body and connected therewith only by the screws 12 at one end and by the support on the pins 13 at the opposite end, so that a minimum amount of the heat generated is carried by conduction to the body. The heater is an open or skeleton structure so that all parts of it are readily accessible, and by removing the four screws, 12, 12, 27, 27, the complete heater may be removed from the body for any purpose which may be desired. The frame of the heater is freely movable under expansion and contraction relatively to the body, which prevents any buckling or distortion, and the guard wires at top and bottom protect the resistance element from short-circuiting. The body is closed at top and bottom by the receptacles, and the circulation of air around the resistance element and consequent loss of efficiency is thus prevented.

The construction of the frame of the resistance element is one of extreme simplicity, permitting of great economies in manufacture and the ready installation of the resistance element.

The foregoing description has been predicated upon that embodiment of the invention which was selected for illustration, but it is not to be understood that the language used in the description is intended to have any limiting effect, for I am aware that there are various features of construction here illustrated and described which are susceptible of alteration and modification without departing from the spirit of the invention as set forth in the appended claims.

I claim as my invention:

1. In an electrical cooking utensil, the combination with the body, of a heater separate from and fitted within the same, said heater comprising a frame, one end of which is supported by said body, and the other end slidingly mounted for free movement due to expansion, and an electrical resistance element carried by said frame.

2. In an electrical cooking utensil, the combination with the body, of a heater separate from and fitted within the same, said heater comprising a frame, fastening means for said frame at one side of said body, and means at the opposite side of said body for slidingly supporting said frame to permit free movement thereof due to expansion, and an electrical resistance element carried by said frame.

3. In an electrical cooking utensil, the combination with the body, of a heater located therein, a frame forming a portion of said heater and comprising metallic side members and a plurality of metallic cross bars supported at their ends on said side members, a resistance element supported in said cross bars, and an electrical insulating material interposed between said resistance element and said cross bars.

4. An electrical heater for use in articles of the character described, comprising a frame provided with side members, a plurality of cross bars supported at their ends on said side members, a resistance element supported in said cross bars and insulated therefrom, and guard wires for said resistance element carried by said cross bars.

5. An electrical heater for use in articles of the character described, comprising a frame provided with side members, a plurality of cross bars connected with said side members, a resistance element supported in said cross bars and insulated therefrom, and guard wires supported in said cross bars at each side of said resistance element.

6. An electrical heater for use in articles of the character described, comprising a frame provided with metallic side members and a plurality of metallic cross bars extending between and connected with said side members, a plurality of apertures through each cross bar, a metallic eyelet located within each aperture, insulating material interposed between said eyelets and cross bars, and a resistance element passing through and supported by said eyelets.

7. An electrical cooking utensil comprising a base, standards mounted at the ends thereof, a body arranged between and secured to said standards, longitudinal channels formed in said standards immediately below said body, a food receptacle provided with flanges adapted to enter said channels and upon which said receptacle may be moved to and from position under said body, a second receptacle forming a closure for the top of said body, and an electrical heater mounted within said body.

8. An electrical cooking utensil comprising a base, standards mounted at the ends thereof, a body arranged between and secured to said standards, longitudinal channels formed in said standards immediately under said body, stops at the rear of said standards, projecting lips at the front thereof lying in the plane of the channels, a receptacle provided with flanges adapted to enter and slide in said channels, a second receptacle forming a closure for the top of said body, and an electrical heater mounted within said body.

9. An electrical cooking utensil comprising a sheet metal base, sheet metal standards mounted at the ends thereof provided at their lower parts with shoulders adapted to rest upon said base and projections extending through slots in said base and folded over against the underside thereof, fastening means therefor, longitudinal channels formed at the upper part of said standards by folding the metal upon itself, a sheet metal body open at top and bottom and arranged between and secured to said standards with the lower edge thereof in the plane of the top of said channels, a sheet metal receptacle flanged at its ends to fit and slide in said channels and act as a closure for the bottom of the body, a second receptacle fitted to the top of said body and acting as a closure therefor, and an electrical heater mounted within said body.

10. In an electrical cooking utensil, the combination with the body, of a heater separate from and fitted within the same, said heater comprising a frame formed of material subject to expansion under heat, means for supporting said frame within said body to permit of its movement relative thereto due to expansion, and an electrical resistance element carried by said frame.

11. An electrical cooking utensil comprising a body and an electrical heater mounted therein, a plate removably secured to said body, attachment plugs mounted in said plate and extending through the wall of said body, and a resistance element forming a part of said heater with its ends connected with said plugs.

12. An electrical cooking utensil, comprising a base, standards thereon, a body carried by said standards, channels on said standards immediately under said body, a food receptacle provided with flanges adapted to enter and slide in said channels to and from position under said body, and an electrical heater mounted within said body.

13. In an electrical heater, an apertured frame member, insulating washers located against opposite sides thereof and overlying said aperture, means for securing said washers together, means to prevent the shifting of said washers on said member, and an electrical resistance element passing through said washers and supported thereby out of contact with said member.

14. In an electrical heater, a frame member provided with a recessed part which is apertured, an insulating washer located in said recess and overlying said aperture, a second insulating washer located at the opposite side of said member, an eyelet securing said washers together, and an electrical resistance element passing through said eyelet and held by said washers out of contact with said frame member.

ALONZO A. WARNER.

Witnesses:
 OSCAR AMORST,
 R. S. COE.